(12) United States Patent
Kucherov et al.

(10) Patent No.: US 7,411,445 B2
(45) Date of Patent: Aug. 12, 2008

(54) PHONON LASER

(76) Inventors: Yan Kucherov, 5646 S. Park Pl. East, Salt Lake City, UT (US) 84121; Peter Hagelstein, 33 B Healed Rd., Carlisle, MA (US) 01741

( * ) Notice: Subject to any disclaimer, the term of this patent is extended or adjusted under 35 U.S.C. 154(b) by 228 days.

(21) Appl. No.: 11/380,633

(22) Filed: Apr. 27, 2006

(65) Prior Publication Data
US 2007/0041412 A1    Feb. 22, 2007

Related U.S. Application Data

(60) Provisional application No. 60/675,627, filed on Apr. 28, 2005.

(51) Int. Cl.
*H01S 4/00* (2006.01)
*H01S 3/04* (2006.01)
(52) U.S. Cl. ............................................. 330/5; 372/34
(58) Field of Classification Search .................. None
See application file for complete search history.

(56) References Cited

U.S. PATENT DOCUMENTS

| 3,693,104 | A  | * | 9/1972 | Silvera et al. ................. 330/5.5 |
| 6,292,499 | B1 |   | 9/2001 | Pearson et al. |
| 6,621,841 | B1 |   | 9/2003 | Soref et al. |
| 2006/0083276 | A1 | * | 4/2006 | Brown .......................... 372/36 |
| 2007/0235070 | A1 | * | 10/2007 | Ila .............................. 136/224 |
| 2007/0297462 | A1 | * | 12/2007 | Jalali et al. ....................... 372/3 |

FOREIGN PATENT DOCUMENTS

JP          63-213391          9/1988

* cited by examiner

*Primary Examiner*—Robert J. Pascal
*Assistant Examiner*—Krista M Flanagan
(74) *Attorney, Agent, or Firm*—Workman Nydegger (57) ABSTRACT

A phonon laser pumped by a thermal gradient, the phonon laser having a coherent phonon pumping media, a heat source and a heat sink. The pumping media includes an array of micro resonators and a thermal phonon emitting media.

25 Claims, 7 Drawing Sheets

PHONON LASER

CROSS-REFERENCE TO RELATED APPLICATIONS

This application claims the benefit of U.S. Provisional Application Ser. No. 60/675,627, filed Apr. 28, 2005, which is incorporated herein by reference.

BACKGROUND OF THE INVENTION

1. The Field of the Invention

The present invention relates to phonon lasers and in particular to phonon lasers pumped by a thermal gradient using a two-stage laser effect, which can have a major impact on heat transfer and can be used in welding, cutting, various sensors, etc.

2. The Relevant Technology

Known are phonon lasers pumped by electron phonon interaction, microwave radiation (I. Silvera, U.S. Pat. No. 3,693,104), heat pulse, typically created by optical laser pulse (D. Cahill et al., *Journal of Applied Physics*, V. 93, No. 2, p. 793-818, 2003). Also known is a device, which might or might not be a phonon laser, having some of the elements of a phonon laser (Y. Qu, U.S. Pat. No. 6,132,823).

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Principle of Operation

Phonons are solid-state lattice vibrations representation, and this formalism is well established in modern physics, see for example, J. M. Ziman, Electrons and Phonons, Oxford University Press, Oxford, 1960-2001 ("Ziman"), which is incorporated herein by reference. There are two types of phonons, acoustic and optical modes. Acoustic phonons in a long wavelength limit correspond to elastic waves, in which neighboring atoms move in the same direction. Optical phonons are vibrations of higher frequency, corresponding to infrared electromagnetic radiation frequencies. For optical phonons neighboring atoms are moving in opposite directions. Relative to a given physical orientation phonons are regarded as either longitudal or transversal, abbreviated LO for longitudal optical phonons and TA for transversal acoustical phonons. Like photons, phonons obey a Bose-Einstein distribution, and most of the optical principles can be applied directly (see, for example, W. Koechner, M. Bass, Solid State Lasers, Springer, 2003 ("Koechner"), which is incorporated herein by reference). Here we will concentrate primarily on heat transfer applications of the phonon laser with an understanding that the same designs can be used in other phonon laser applications.

An optical laser works when the pumping of active media exceeds losses in the media.

Let us imagine that we have a piece of a solid with a cubic shaped active media iimbedded in an infinite solid matrix, and see at what conditions it becomes a phonon laser, assuming that one of the sides emits phonons. For simplicity we will ignore umklapp processes, which can decrease laser efficiency if heat regeneration mechanisms are absent. Each side of a cube emits phonons according to the phonon spectrum of the matrix. Depending on the matrix material, maximum phonon frequencies vary from a few terahertz for most metals to a few tens of terahertz for materials like diamond, boron nitride etc., (see Landolt-Bornstein, *Numerical Data in Science and Technology*, Springer-Verlag, NY, 1982 ("Landolt-Bornstein"), which is incorporated herein by reference). Intensity of a phonon flux at thermal equilibrium is subjected to the Stefan-Boltzmann law, irrespective of the spectrum. According to the Stefan-Boltzmann law, a 1 cm$^2$ surface area emits approximately 0.01 W of heat at $-100°$ C., 0.1 W at $100°$ C., 0.25 W at $200°$ C., 2 W at $500°$ C. and so forth. Emitted phonons propagate through the cube with an attenuation coefficient a specific for a given frequency (mode). a defines a phonon flux intensity I change from an initial intensity $I_o$, after the phonon travels a distance L:

$$I=I_o \exp\{-\alpha L\}, \text{ or attenuation length } L=1/\alpha \ln(I_o/I) \quad (1)$$

For simplicity let us assume that the phonon flux with intensity $I_o$ is emitted from one side of the cube, travels the distance L to another side of the cube, reflects diffusively with reflection coefficient r, comes back to the emitting surface, reflects again and joins phonons emitted from the original side, lost to the opening in the cube. In this manner two opposite sides of the cube create a resonator. By way of definition, the term resonator as used herein includes resonators, waveguides, and all other objects known in the art to resonate phonons. If our mode is resonant, for example an integer number of half waves equals L (phonon wavelength $\lambda=c/v$, where v is frequency and c is the speed of sound in a cube material), it amplifies and becomes coherent. Coherent mode is not subjected to thermal iradiation law (Stefan-Boltzmann) limitations, and the open side of the cube now can emit more than the other sides.

For our example simple calculation gives approximate lasing conditions when $\alpha<0.03/L$, assuming $r=0.5$. It is evident that the smaller the L the easier it is to obtain lasing, as long as L is larger than half of the phonon wavelength. It is evident that lasing is easier when the attenuation is smaller and the reflection coefficient is larger. If only part of a cube's side is emitting phonons, the lasing condition will be easier.

Most of the emitted phonons have frequencies in the terahertz range, for which a phonon scattering length, even for the best materials, is around ten angstroms and the attenuation is very high. On the other hand, phonons "down convert", meaning that a high frequency phonon decays typically into two phonons with a lower frequency and then this process repeats itself. It means that somewhere down this chain the frequency will be resonant, and the resonator will intercept this phonon. For a planar resonator with the thickness L, resonant longitudal modes are separated by wavelength:

$$\Delta\lambda = \lambda 2/2L, \text{ or } \Delta v = c/2\pi L, \tag{2a}$$

or frequency $$\Delta v = c/2\pi L, \tag{2b}$$

As L becomes smaller, more and more phonons can be intercepted at the same temperature, and freestanding particles with a size of a few microns and having smooth boundaries are most likely lasers at room temperature for a lot of solids, when they are immersed in a media that has a different elastic constant than the particles and pumps them with thermal phonon radiation. Micro lasers also can be pumped by thermal optical radiation. If these particles are made of materials with low attenuation coefficients, like most single crystals, most oxides, and even hard plastics, like PVDF, they can be lasers and emit phonons through the contact points with each other or adjacent structures. Table 1 gives the attenuation coefficients at room temperature, speeds of sound and corresponding wavelengths at 1 GHz frequency for some materials with small attenuation that can be used for a resonator or thermal leads. The data is from Landolt-Bornstein, and Tables of Physical Values, I. Grigoriev, ed., Energoatomizdat, Moscow, 1991, which is incorporated herein by reference.

TABLE 1

| Material | Attenuation coefficient α, $10^3$ m$^{-1}$ | Speed of sound c, for longitudal acoustical phonons for <100> orientation km/s | Wavelength λ microns |
|---|---|---|---|
| C (Diamond) | 0.18 | 17.5 | 17.5 |
| Al$_2$O$_3$ (sapphire) | 0.4 | 11.2 | 11.2 |
| MgO | 1.3 | 8.9 | 8.9 |
| TiO$_2$ | 3.5 | 8 | 8 |
| LiNbO$_3$ | 1 | 6.1 | 6.1 |
| SiO$_2$ (quartz, crystal) | 0.8 | 5.7 | 5.7 |
| Fused quarts | 1.8 | 5.7 | 5.7 |
| Garnet (YAG) | 0.45 | 8.5 | 8.5 |
| Si | 8.7 | 8.3 | 8.3 |
| AlN | 0.6 | 12.2 | 12.2 |
| Si$_3$N$_4$ | 3.5 | 11.1 | 11.1 |
| Al | 1560 | 6.3 | 6.3 |
| Cu | 2800 | 4.3 | 4.3 |

Some nitrides and borides also have low attenuation coefficients and can be considered for resonator materials. Metals are unlikely candidates for resonator materials, as attenuation is too high because of electron-phonon scattering. Semiconductors that have lower electron concentrations can be used in some cases. Attenuation due to the electron-phonon scattering in semiconductors becomes significant at carrier concentrations above about $10^{18}$ cm$^{-3}$.

Attenuation coefficients are proportional to the square of the frequency and can be extrapolated for different frequencies. Attenuation coefficients increase with temperature and compete with increased pumping at elevated temperatures.

Debye temperature is also a limiting factor, with 1500 K for the diamond, 1000 K for MgO, AlN and Al$_2$O$_3$ and 550 K for quartz. From Table 1 it is evident that diamond has the best properties, but diamond is cost-prohibitive for most applications. Materials like Al$_2$O$_3$, AlN, Quartz, MgO, and Garnets are more reasonable resonator materials.

Let us imagine we have a solid rod with a square-shaped 1 cm$^2$ cross-section, and 11 cm length with 1 cm on one side as a hot side heat-exchanging surface, and 1 cm of a cold side heat exchange surface. The heat W conducted through the rod is defined as W=k∇TS, where k is the rod material thermal conductivity, ∇T is the temperature difference between the hot and cold sides, and S is the cross-section area. If ∇T=100 K and rod material is the best known heat conductor, diamond, with k=2000 W/(mK), W would be 200 W. All the heat for an insulator like diamond is carried by phonons, and it is easy to estimate phonon drift velocity, using a phonon spectrum of the material (see Landolt-Bornstein) and the number of atoms in a volume. Drift velocity in this case is approximately 0.1 cm/s.

If we could build a phonon laser with the same resonator size, and the same heat exchanging surfaces, phonon velocity will be the speed of sound, which in this case is 17 km/s, or $1.7 \times 10^6$ times faster. The ratio of one fourth of the speed of sound (geometric factor) to the phonon drift velocity gives the theoretical limit of thermal conductivity enhancement with a phonon laser with 1:10 thickness to length ratio ($4 \times 10^5$). The enhancement depends on the rod length, i.e. for a longer rod it will be larger because the drift velocity is less, and for a shorter rod it will be smaller.

Phonon reflection from interfaces of materials with different elastic constants and phonon resonators are known in the literature (see Ziman and V. Narayanamurti et al, Phys. Rev. Letters, 43, 2012 (1979)). The problem is that at 100° C., according to the Stefan-Boltzmann law our heat exchange surface can emit only 0.5 W and only 0.1 W of it can be transmitted through 1 cm$^2$ of resonator cross-section even without attenuation losses. In other words, we must find a way to pump our resonator with coherent phonons, instead of phonons with a thermal spectrum, and convert them into a resonant harmonic of the resonator.

The second task is relatively easy, because more than 90% of phonon spectrum energy for all materials is at frequencies exceeding $10^{11}$ Hz. These phonons down convert, meaning that a predominant process is the decay of one high frequency phonon into two phonons with half the frequency. This process repeats itself, and at some step it will match the resonant frequency of the resonator. The more down conversion steps we have, the more the phonon spectrum will resemble the thermal spectrum, so more efficient pumping occurs when there are fewer conversion steps. Ideally, a pumping resonator has the same frequency as the major resonator, but can have a frequency $2^n$ times that of the major resonator, where n does not exceed 3-5.

Creating micro resonators is a more complex task. Let us evaluate possible power densities at 100° C. on the hot side or approximately 0.1 W/cm$^2$ thermal radiation density. A 1 cm cube has a surface area of 6 cm$^2$ (1×1×6). If we cut it into 0.1 cm cubes, the combined surface area will be increased ten times (0.1×0.1×6=0.06 per cube, and since there are a now a thousand cubes, the total=0.06×1000=60 cm$^2$). Evenly packed spheres will have 0.52 times the integral surface area of equally sized cubes. 1 micron spheres will have a surface area of approximately $3 \times 10^4$ cm$^2$ per 1 cm$^3$ of volume, or $3 \times 10^3$ W/cm$^3$ of thermal radiation flux.

In all cases, as known from optics, two times the attenuation length L in equation (1) must be larger than half of the wavelength in a planar resonator approximation, which states that resonance can be achieved when $$n\lambda/2 = L \quad (3),$$

where n is an integer and λ is the wavelength, defined as λ=c/v. Combining equation (1) and the fact that the micro resonator resonant frequency must be the same as or two times the frequency of the pumped resonator to ensure coupling, we can estimate the best case scenario for the best existing material, diamond, and I°/I=2. For larger attenuation it is not realistic to have a laser. In this (expensive) case the micro resonator size is approximately 0.2 microns, and the pumping power density can be as high as approximately $2 \times 10^4$ W/cm³. For a micro resonator made of $Al_2O_3$ and a more realistic 10% attenuation, the power density is approximately $2 \times 10^3$ W/cm³, and for quartz it is $1-2 \times 10^3$ W/cm³, depending on the type of quartz. Two other competitive materials for micro resonators are MgO and AlN. The volume power density for other materials will be smaller.

In general, depending on the material and phonon frequency, the attenuation coefficient for both micro resonators and main resonators can be from $10^{-1}$ meters⁻¹ to $10^5$ meters⁻¹. In one embodiment, a main resonator can comprises one of a cylindrical fiber, a ribbon, or a sheet. In one embodiment, a micro resonator can be shaped in the form of a sphere, a cylinder or a plate.

An immersion media which emits a thermal spectrum of phonons can be selected depending on the temperature and the phonon spectrum, i.e., it must have a different phonon spectrum from the micro resonator material. For example, at temperatures less than 200-300° C. liquids can permeate densely packed micro resonators. For example, high temperature plastics or epoxies, silicone, transformer oil, or motor oil can be used. For higher temperatures, to avoid mechanical stress, soft metals like indium, oxides with low melting points and low attenuations are preferred, such as boron oxide or phosphorus oxide for example. In some cases low melting point glass can be used. Potable ceramics or high temperature glues, such as chromium aluminum phosphate or cements can also be used.

Laser Designs

Figure 1:
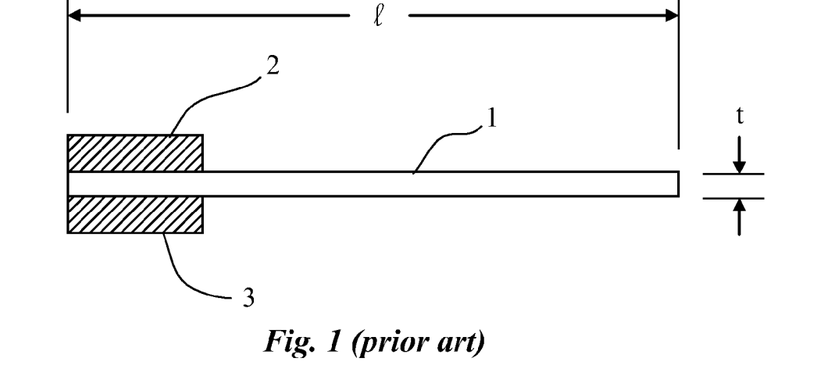
FIG. 1 is a cross-sectional side view of a conventional phonon laser pumped by a thermal gradient.

A conventional design of a phonon laser pumped by a thermal gradient is shown in FIG. 1. The laser consists of a resonator 1 with a length l much greater than its thickness t, and a heat sink 2 and heat source 3. For example, in the exemplary laser shown in FIG. 1, which is made of quartz and designed for 1 GHz operation, the length l of resonator 1 is 10 cm and the thickness t is 2.8 microns. Typically, heat sink 2 and heat source 3, are metals. When heat is applied to heat source 3, emitted non-equilibrium phonons down-convert until the phonon frequency is close to the resonant frequency of resonator 1. This frequency is amplified and coherent phonons propagate away from the heat source 3. Such a system has a lot of thermal losses because resonator 1 is thin.

Figure 2A:
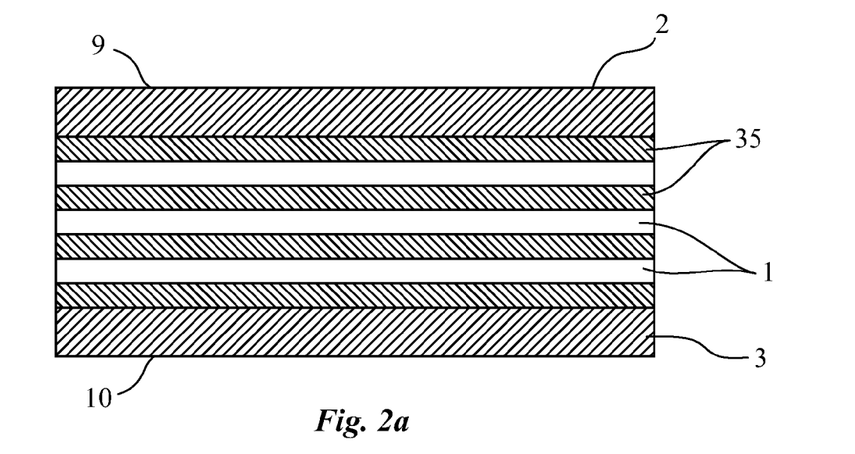
FIGS. 2a-2b are cross-sectional side views of a phonon laser having multiple layers, according to one embodiment of the current invention.
Figure 2B:
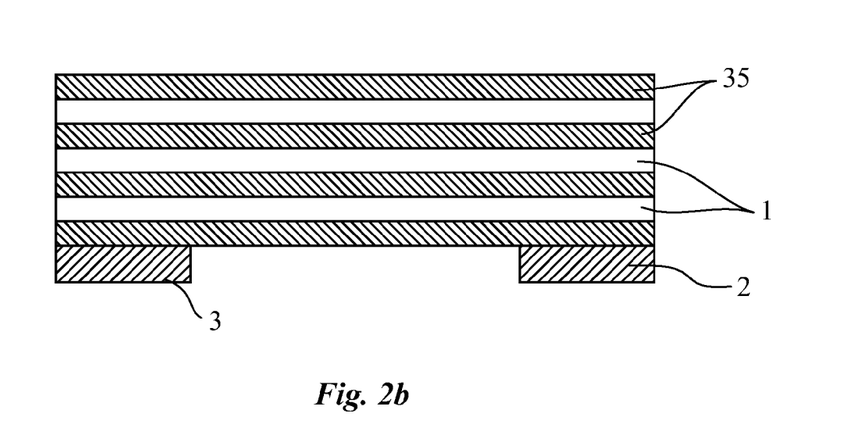

A multi-layered design, with resonators 1 interleaved with thin metal layers 35 approximately 1 micron thick is shown in FIGS. 2a-2b. Although FIGS. 2a and 2b include three resonator layers 1 and four metal layers 35, it is appreciated that more or less numbers of layers alternatively can be used. In one embodiment, the number of resonator layers is between 1 to 1,000 with 100 to 300 being more common. Again, other numbers of layers can also be used. The thickness of the resonator layers can be a variety of different sizes and depends on the material and resonate frequency. Generally, the lower the resonate frequency, the greater the thickness of the layer. Examples for 1 GHz are shown in Table 1.

As shown in FIG. 2a, heat flow can be applied along the entire length l of resonators 1 and this system is more practical. However, the metal layers 35 limit pumping, because the cold side 9 is too far away from the hot side 10 to create non-equilibrium phonon flux. For example, because the pumping rate is defined by the Stefan-Boltzmann law, in an embodiment having 10 layers and an area of 1×10 cm² we can deliver approximately 20 W of heat to the cold side 9 at 100° C. and 28 microns overall thickness T. This number is not bad and in some cases, for example for low frequency plastic resonators, this design makes sense. For anything but plastics, however, ribbons that are a few microns thick are typically expensive and difficult to handle, though single crystals of most of the low attenuation materials in Table 1 can be produced by chemical vapor deposition (CVD), etc. A single resonator 1 made of quartz can handle approximately $10^3$ W, but cannot be sufficiently pumped by this approach.

Figure 3A:
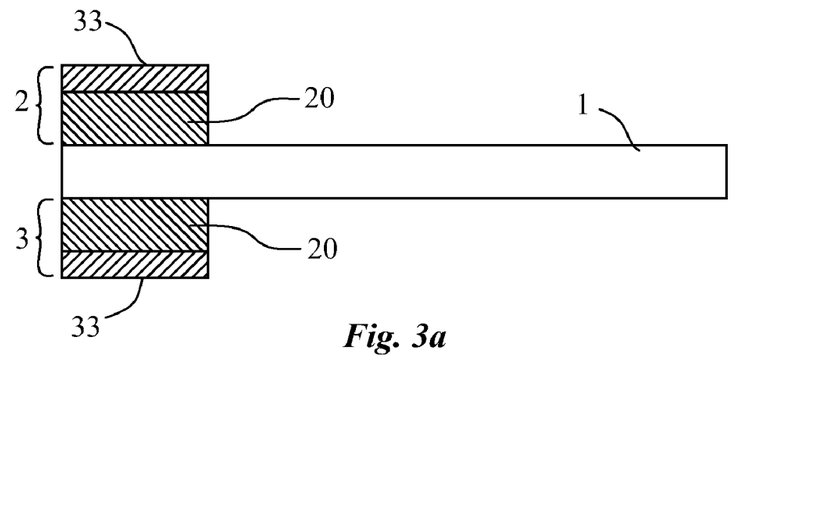
FIG. 3a-3c are cross-sectional side views of phonon lasers according to various embodiments of the current invention.
Figure 3B:
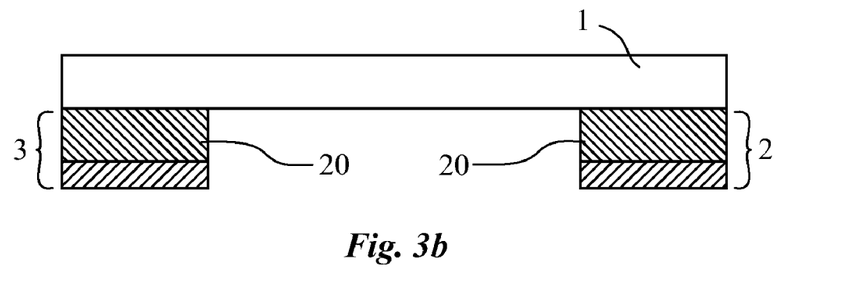
Figure 3C:
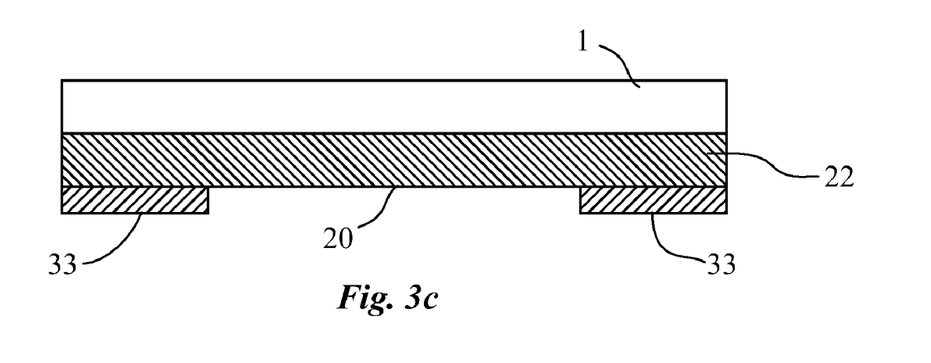

FIGS. 3a-3c illustrate another approach, according to various embodiments of the current invention, in which one or more micro resonator layers 20 are used to pump resonator 1. When using this approach, heat sink 2 and heat source 3 can be disposed in various locations with regard to resonator 1. For example, in FIG. 3a, heat sink 2 and heat source 3 are positioned on opposite sides of resonator 1, but on the same end of resonator 1, similar to the conventional phonon laser shown in FIG. 1. In FIG. 3b, heat sink 2 and heat source 3 are positioned on the same side of resonator 1, but on opposite ends of resonator 1, and in FIG. 3c, heat sink 2 and heat source 3 extend toward each other and merge to form a single heat pumping layer 22.

Figure 4A:
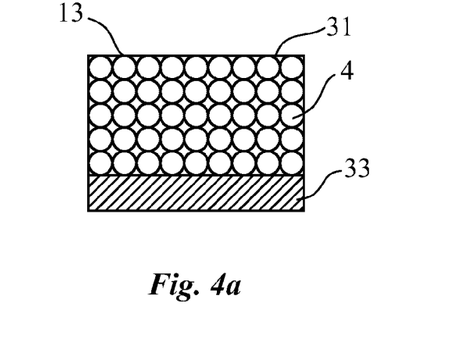
FIGS. 4a-4e are cross-sectional side views of phonon pumping media that can be used with phonon lasers in which micro resonators are used to pump the main resonator according to various embodiments of the current invention.

FIG. 4a shows a coherent phonon pumping media 13, which can be used as heat sink 2 or heat source 3 in FIGS. 3a and 3b, or the heat pumping layer 22 in FIG. 3c. Phonon pumping media 13 includes a metal or ceramic heat exchange surface 33 and an array of micro resonators 4 free standing or immersed in a thermal phonon emitting media 31. Exemplary materials for micro resonators 4 in terms of minimum attenuation are diamond and single crystal $Al_2O_3$, cubic BN and AlN. Quartz can also be used. Although quartz is less efficient, it is cheaper and has a more developed manufacturing infrastructure. We will describe quartz resonators with an understanding that other materials, such as $Al_2O_3$, MgO and AlN that are also commercially available in this form, can alternatively be used.

A resonator quality Q is defined to be 2π times the ratio of stored to dissipated energy in a single pass. In the example above, Q is approximately 60. Using the above described method of comparing attenuation lengths at 10% attenuation and phonon wavelength, we can see that the minimum size of a particle pumped by thermal radiation is about 0.3 microns at approximately $10^{10}$ Hz. A size of 0.3 microns simply represents a minimum size, and it is appreciated that a particle pumped by thermal radiation can be between about 0.3 microns to about 100 microns depending on the material. Other sizes of particles can also be used. In reality, attenuation decreases for a resonant mode of a resonator. A larger micro sphere 4 of approximately 1 micron diameter with smaller attenuation corresponds to a Q of approximately $10^6$ at approximately $3 \times 10^9$ Hz resonant frequency. As can be seen by these numbers, most of the micro sphere thermal energy will be stored in a resonant mode.

Thus, a packed collection of micro spheres 4 will conduct heat from heat exchange surface 33 in a resonant manner (strongly deviating from a thermal phonon spectrum) when the diameter variation is less than 50% when resonance lines are overlapped. If interface contacts between the spheres 4 are of good quality, the sphere collection conducts heat better than solid quartz, because the average phonon frequency is $10^3$-$10^4$ times lower than the average frequency of a phonon spectrum, with $10^6$-$10^8$ times lower attenuation. This principle can also be used to replace the resonator 1 in FIG. 1 by a collection of micro spheres 4, as illustrated in the embodiments of FIGS. 5a-5c.

Figure 5A:
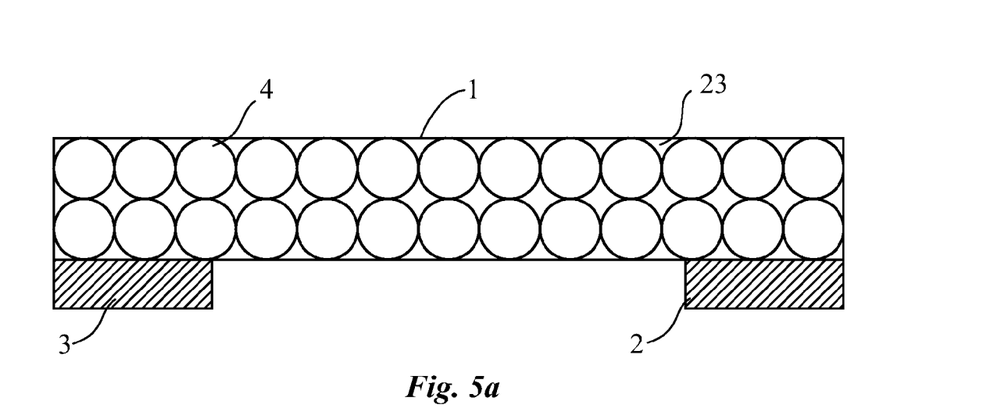
FIGS. 5a-5c are cross-sectional side views of other embodiments of the current invention in which micro spheres are used in the main resonator of the phonon laser.

Depicted in FIG. 5a, resonator 1 comprises an envelope containing micro spheres 4 imbedded in a phonon conducting media 23, with heat being transferred from heat source 3 to heat sink 2, situated on the same side of resonator 1. A reflecting surface is considered smooth when surface irregularities are less than $\lambda/2\pi$, where $\lambda$ is a phonon wavelength (see Ziman). This means that the design of the depicted embodiment is easier to implement for lower frequencies, (e.g., less than 1 GHz) where surface irregularities can be larger without ruining phonon propagation. If micro spheres 4 are imbedded into a phonon conducting media 23 to form resonator 1, and the thickness of resonator 1 is at least two times larger than the radius of the spheres 4, the media 23 will be self-pumping.

Figure 5B:
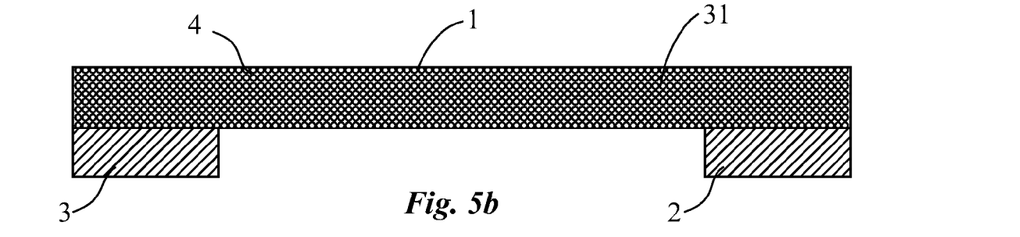

Illustrated in FIG. 5b, one embodiment includes many layers of micro spheres 4 made of quartz or sapphire imbedded into a thermal phonon emitting media 31, which can be comprised of plastic, high temperature epoxy, Kapton® or PVDF, or a low melting point glass or ceramics. This design can be convenient for heat spreaders in a sheet form, but also can be used in shapes like rods, squares, etc., in which the resonator thickness allows attenuation length L defined from formula (1) to be larger than half of the phonon wavelength and half of the resonator thickness.

Figure 5C:
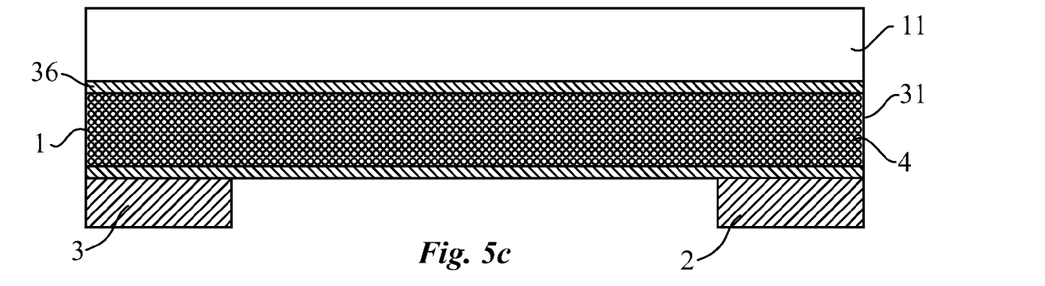

In some embodiments, a metal cladding 36 as illustrated in FIG. 5c can be used to improve phonon reflection between two similar materials without changing the resonant frequency. As shown in the embodiment depicted, a second phonon resonator 11 is disposed above resonator 1, and a metal cladding 36 is disposed between resonator 1 and resonator 11. Resonator 11 comprises the same media 31 as resonator 1, but unlike resonator 1, resonator 11 has no spheres. Resonator 1 pumps resonator 11, which reduces attenuation. Resonator 11 can also be made of different materials with low attenuation, such as many of those listed in Table 1 or even comprise a liquid in an envelope. This embodiment makes particular sense for low frequency plastic resonators having a frequency below about $10^9$ Hz, which are easy to manufacture.

When phonon emitting media 31 comprises a vacuum, the only loss mechanism is optical thermal radiation, which is regenerated back if the thickness of a layer filled with micro spheres is sufficiently large, e.g., more than 10 microns for quartz at 100° C., when the thermal radiation wavelength is approximately 45 microns. From here we go back to the design shown in FIG. 3, where micro resonators are pumping major resonator 1. The maximum micro sphere diameter is defined by the resonant frequency of resonator 1. For example, at 1 GHz, the resonator thickness for quartz is about 2.8 microns and at 100 MHz the resonator thickness is about 28 microns.

A thick layer of micro spheres 4 with non-ideal contact surfaces can introduce thermal resistance problems, because the layer thermal conductivity in such a case is less than for bulk material. Using the quartz example from above, as the thermal gradient across this layer is small, say 1 degree, the power density will be limited by the thermal conductivity of this layer, which is about 0.1-0.3 of the bulk material. Quartz thermal conductivity is typically relatively low, about 10-12 W/(mK), and we are limited to 10-30 W/cm² heat flow in the quartz example.

The immersion media does not help much, as phonon attenuation in the media is typically higher than in quartz, and on its own the media only conducts a thermal spectrum of phonons, which do not contribute to pumping. AlN has a thermal conductivity about twenty times higher than quartz, but AlN is typically more expensive than quartz.

Figure 4B:
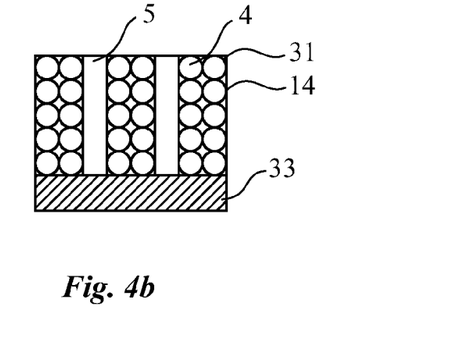

Returning to FIGS. 4b-4e, to increase the power density a two-stage pumping scheme is provided according to various embodiments of the current invention. For example, illustrated in FIG. 4b is a phonon pumping media 14 that can be used as heat sink 2 or heat source 3 in FIGS. 3a and 3b or heat pumping layer 22 in FIG. 3c. Pumping media 14 is similar to pumping media 13 shown in FIG. 4a, except that pumping media 14 includes intermediate resonators 5 interspersed among micro spheres 4. These intermediate resonators can be comprised of the same material as resonator 1, or some other known resonator material, such as quartz, $Al_2O_3$, and AlN. This allows micro spheres 4 to pump intermediate resonators 5, which in turn pump major resonator 1.

Figure 4C:
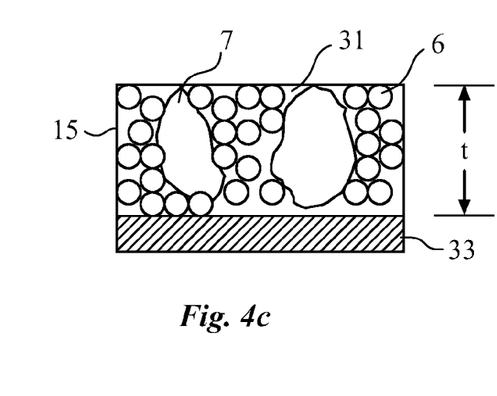

FIG. 4c shows another embodiment of a phonon pumping media 15. In pumping media 15, micro spheres 4 are replaced with a first powder 6 having approximately the same size as micro spheres 4, mixed with a second powder 7 having approximately the same size as the thickness t of major resonator 1, imbedded in phonon emitting media 31. In this embodiment, the immersion media 31 is essential. A potential problem, however, is that immersion media 31 will tend to delaminate from resonator 1 with thermal expansion and contraction as the temperature changes. Axial stress also will add to the problem. In this sense micro spheres 4 are ideal contacts, as they can slide or roll along resonator 1 without ruining the contact.

Figure 4D:
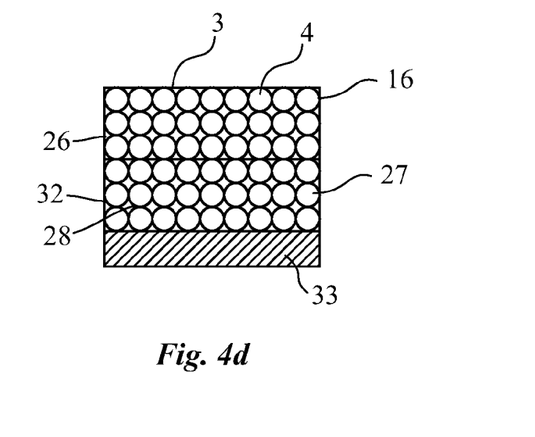

Another design is shown in the embodiment depicted in FIG. 4d, in which phonon pumping media 16 comprises a first layer 26 disposed adjacent to resonator 1 and a second layer 32 disposed adjacent to first layer 26 and adjacent to heat-exchanging surface 33. First layer 26 comprises micro spheres 4 comprised of the same material and with approximately the same diameter as the thickness t of resonator 1. Second layer 32 comprises a collection of particles 27 immersed in a solid phonon emitting media 28. Although shown as being equal in size to micro spheres 4, particles 27 alternatively may be smaller or larger than micro spheres 4. The thickness of layer 32 can be adjusted so that it also becomes a resonator with a frequency matching the resonant frequency of micro spheres 4 or resonator 1. Having an additional resonator reduces phonon attenuation.

Figure 4E:
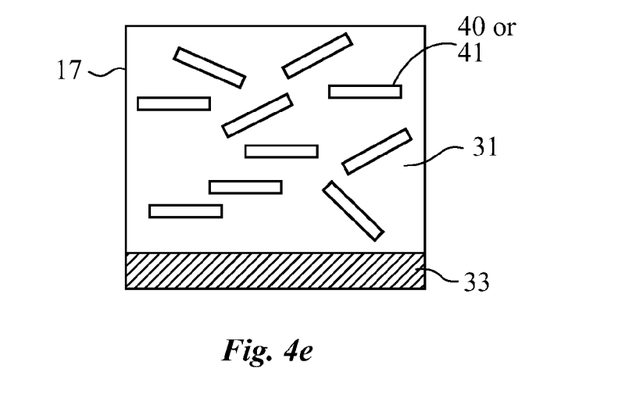

FIG. 4e shows another alternative embodiment of a phonon pumping media 17, in which an array of micro cylinders 40 or microplates 41 can be used in place of micro spheres 4. When micro cylinders 40 are used, the diameter of each cylinder 40 is defined in the same fashion as the diameter of each sphere 4, described above. For each cylinder, the ends of the cylinder represent a leakage path of a resonator and the length of the cylinder cannot be longer than the attenuation length L, defined above. When microplates 41 are used, the thickness of each microplate 41 is again defined in the same way as the diameter of each micro sphere 4. Either micro cylinders 40 or micro plates 41 can be immersed into a phonon conducting and emitting media 31 as illustrated and the micro cylinders 40 and microplates 41 are used to pump major resonator 1.

Figure 6A:
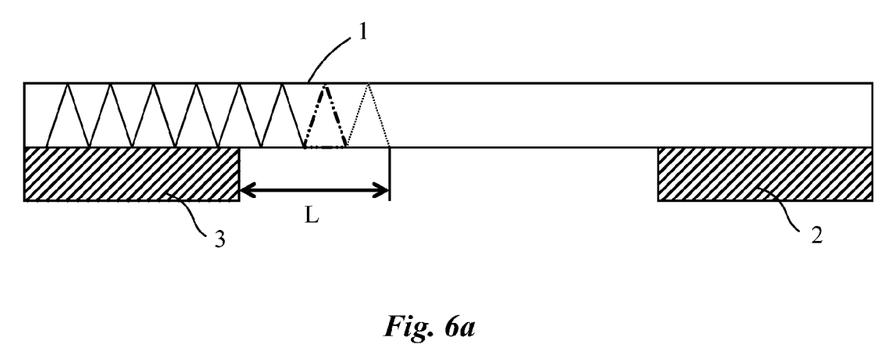
FIGS. 6a-6b are cross-sectional side views of phonon lasers illustrating the differences in phonon propagation between two different types.
Figure 6B:
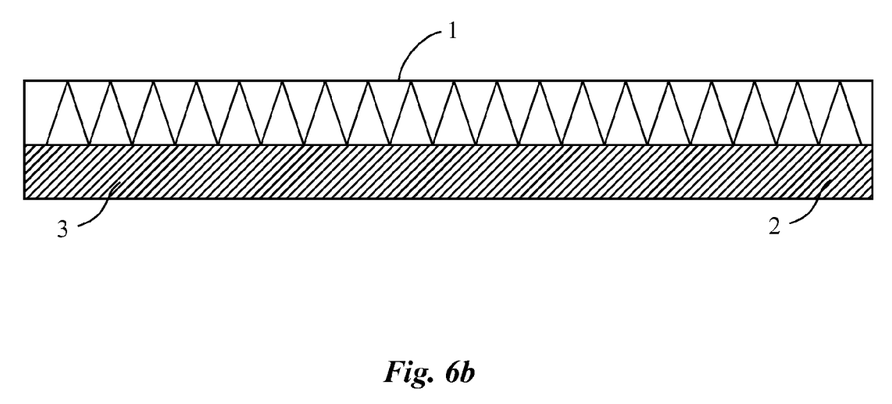

In addition to replacing separate heat source 3 and/or heat sink 2 with pumping media 13-17 shown in FIGS. 4a-4e, respectively, pumping media 13-17 can alternatively be extended along the whole length l of resonator 1, as shown in FIGS. 3c and 6b to form heat pumping layer 22 which in this case functions as a heat regeneration layer. This design has a lot of advantages for heat conducting applications. Without this extension, the length of heat conductor 2 or 3 is limited by the attenuation length L of the phonons in resonator 1, which can be reasonably long. For example, the attenuation length L is typically in the centimeter range for low phonon frequencies with associated lower pumping power densities. This situation is illustrated in FIG. 6b, in which heat source 3 heats up at the phonon attenuation length and then pumps resonator 1 again. The process repeats itself within resonator 1 until heat decouples at heat sink 2. This design allows long heat conductors, because heat regenerates within the device itself.

Figure 7A:
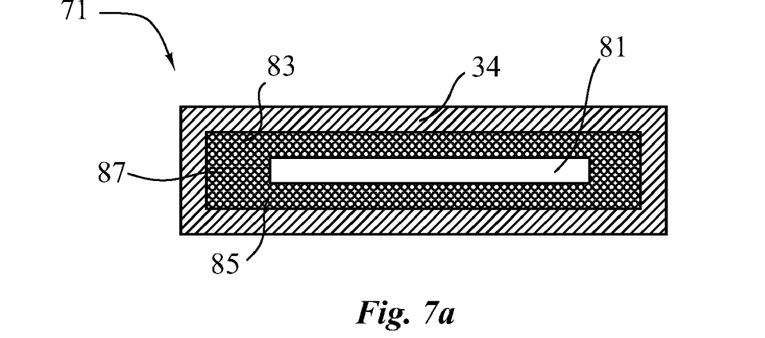
FIGS. 7a-7c are cross-sectional end views of flexible heat conductors according to various embodiments of the current invention.

In many cases it is beneficial to have flexible heat conductors. A collection of spheres can be bent within a retaining envelope, but resonator 1, especially if it is made of materials such as quartz, $Al_2O_3$ or AlN, can be flexible only when it is thin enough and within certain shapes, such as ribbons and fibers. FIG. 7a illustrates a flexible heat conductor 71 comprising a ribbon-type resonator 81 immersed in a coherent phonon pumping media 83 according to one embodiment of the current invention. Pumping media 83 comprises a micro resonator array 85 in a thermal phonon emitting media 87. Any of the pumping media 13-17 depicted in FIGS. 4a-4e can be used as pumping media 83. The resonator 81 is enclosed in an envelope 34, the envelope 34 being a heat exchange surface having hot and cold sides. In some embodiments envelope 34 is insulated between the hot and cold sides. This design can be used in heat spreaders, for example.

Figure 7B:
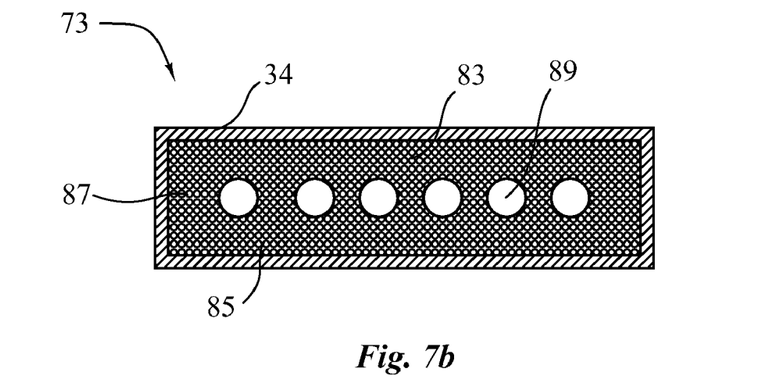

For many applications, fibers have a big advantage over ribbons, as they can be bent in any direction, and manufacturing infrastructure already exists, especially for quartz fibers which are used in fiber optic cables and light guides. Pulling fibers from a heated pedestal produces $Al_2O_3$ and AlN fibers. Heating in this case is typically by $CO_2$ lasers. These fibers are typically used for high temperature fiber optic sensors, but volume is limited, and at this point cost per unit length is much higher than for quartz. A ribbon-type heat conductor 73, similar to heat conductor 71, is shown in the embodiment depicted in FIG. 7b. In heat conductor 73, the ribbon resonator 81 is replaced with several fibers 89 spaced apart from each other. Functionally this design is the same as heat conductor 71 shown in FIG. 7a, but in many cases it is easier to manufacture.

Figure 7C:
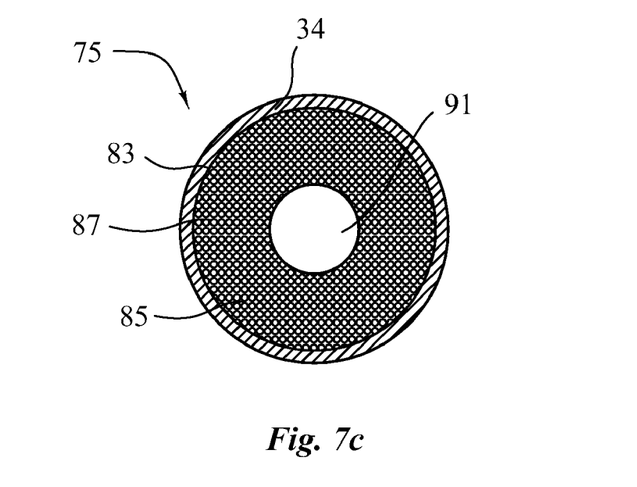

Another alternative embodiment of a flexible heat conductor 75 is shown in FIG. 7c, in which a resonator 91 is in cylindrical form, resembling a coaxial or fiber optic cable with a single fiber in the middle. As with heat conductors 71 and 73, any of the pumping media 13-17 depicted in FIGS. 4a-4e can be used as pumping media 83. Matching the resonator frequency of resonator core 91 and pumping media ring 83 can be done to increase the efficiency of heat conductor 75.

Figure 8A:
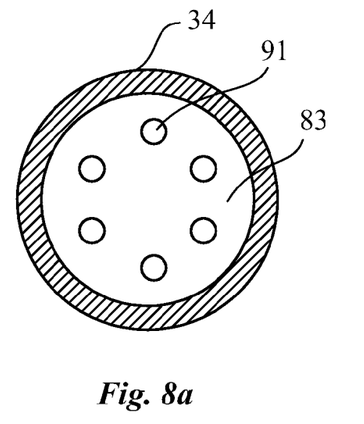
FIGS. 8a-8c are cross-sectional end views showing different arrangements that can be used with the flexible heat conductor shown in FIG. 7c.
Figure 8B:
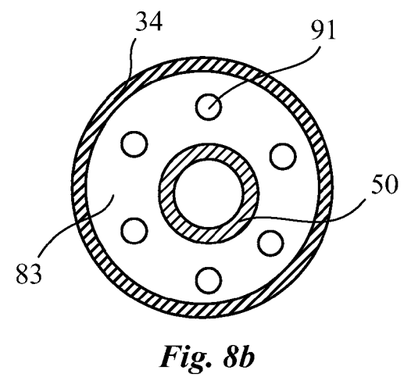
Figure 8C:
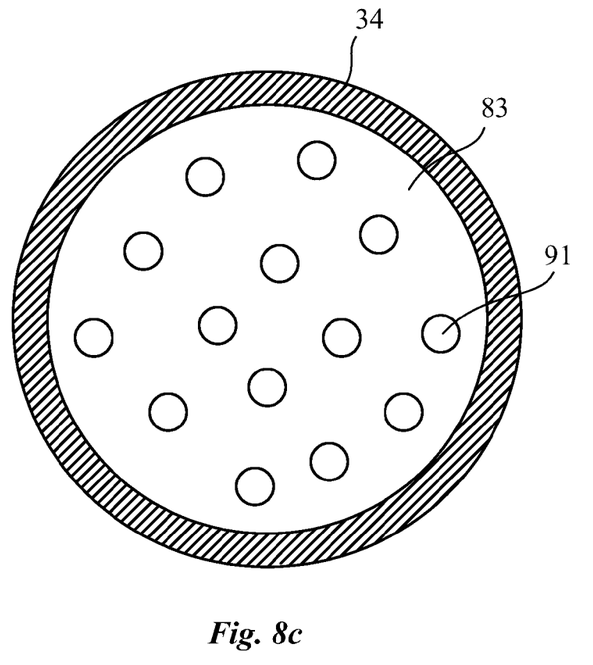

Various cable shapes can be used with heat conductor 75, in which fiber resonators 91 are enclosed in pumping media 83. A few examples of these are shown in FIGS. 8a-8c. For example, FIG. 8a illustrates one embodiment in which multiple resonators 91 are disposed close to heat-exchanging surface 34 in a ring pattern. FIG. 8b illustrates another embodiment, similar to the previous embodiment except that it includes a hollow cable 50 in the center of heat conductor 75, which allows heat conductor 75 to use less media 83. FIG. 8c illustrates another embodiment in which multiple resonator-fibers 91 are distributed throughout the pumping media 83. This design is especially useful for high power applications.

Although the foregoing discussion concerns heat conducting applications, it is appreciated that the phonon laser designs discussed herein can also be used in numerous other applications, for example welding, cutting, medical devices, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A phonon laser pumped by a thermal gradient, the phonon laser comprising:
a main phonon resonator;
a coherent phonon pumping media, the pumping media comprising:
an array of micro resonators; and
a thermal phonon emitting media, the coherent phonon pumping media being in thermal communication with the main resonator;
a heat source being in thermal communication with the main resonator or the coherent phonon pumping media; and
a heat sink being in thermal communication with the main resonator or the coherent phonon pumping media.

2. A phonon laser according to claim 1 wherein a resonant phonon frequency of the micro resonators or the phonon pumping media is matched to a resonant frequency of the main resonator.

3. A phonon laser according to claim 1 wherein the phonon pumping media further comprises one or more intermediate resonators interspersed among the micro resonators.

4. A phonon laser according to claim 3 wherein the micro resonators comprise a first powder and the intermediate resonators comprise a second powder.

5. A phonon laser according to claim 1 wherein the main resonator comprises one of a cylindrical fiber, a ribbon, or a sheet and has a phonon attenuation coefficient between about $0.1\ m^{-1}$ to about $10^5\ m^{-1}$.

6. A phonon laser according to claim 1 wherein the micro resonators have a phonon attenuation coefficient between about $0.1\ m^{-1}$ to about $10^5\ m^{-1}$ and are shaped in the form of a sphere, a cylinder or a plate.

7. A phonon laser according to claim 1 wherein the array of micro resonators comprises;
a first micro resonator having a resonant frequency substantially matching a resonant frequency of the main resonator; and
a second micro resonator having a size that is $2^n$ times smaller than the first micro resonator, where n is an integer between 1 and 6.

8. A phonon laser according to claim 1 wherein the main resonator comprises a solid or a liquid and the micro resonators are embedded in the solid or liquid, and wherein a resonant frequency of the micro resonators is about $2^n$ times higher than a phonon resonant frequency of the main resonator, where n is an integer between 1 and 6.

9. A phonon laser according to claim 1 wherein the main resonator or the micro resonators or both are made of single crystals or fused oxides or nitrides.

10. A phonon laser according to claim 9 wherein the single crystals or fused oxides or nitrides are selected from a group consisting of: quartz, $Al_2O_3$, AlN, MgO, TiO, ZrO, $Y_2O_3$, $LiNbO_3$, $LiTaO_3$, $PbZrTiO_3$, $Si_3N_4$, garnets, BN, borides, and diamond.

11. A phonon laser according to claim 1 wherein the main resonator or the micro resonators or both are made of one or more plastic or semiconductor with carrier concentrations below $10^{18}$ cm$^{-3}$.

12. A phonon laser according to claim 11 wherein the one or more semiconductor or plastic is selected from a group consisting of: GaN, Si, Ge, GaAs, SiC, Kapton and PVDF.

13. A phonon laser according to claim 1 wherein the thermal phonon emitting media comprises one or more of the following: a liquid, an epoxy, a glass, a plastic, a potable ceramic, a chromium aluminum phosphate, a boron oxide, a phosphorus oxide, and a low melting point metal.

14. A phonon laser according to claim 1 wherein the phonon pumping media and the main resonator extend from the heat source to the heat sink.

15. A phonon laser according to claim 1 wherein the phonon pumping media and the main resonator are enclosed in a thermally conductive envelope.

16. A phonon laser according to claim 1 wherein the main resonator comprises an array of fibers, ribbons or sheets that are enclosed together with the phonon pumping media into a thermally conductive envelope.

17. A phonon laser pumped by a thermal gradient, the phonon laser comprising:
a plurality of stacked main resonators, each main resonator being formed as a ribbon or a sheet;
a plurality of metal layers interleaved with the plurality of main resonators;
a heat source in thermal communication with one of the main resonators or one of the metal layers; and
a heat sink in thermal communication with the same resonator or metal layer as the heat source.

18. A phonon laser comprising:
a phonon resonator having a first side extending between a first end and a spaced apart second end;
a heat source in thermal communication with the first side of the phonon resonator; and
a heat sink in thermal communication with the first side of the phonon resonator.

19. A phonon laser according to claim 18, wherein the heat source is disposed at the first end of the phonon resonator and the heat sink is disposed at the second end of the phonon resonator.

20. A phonon laser pumped by a thermal gradient, the phonon laser comprising:
a first phonon resonator having a thickness and being comprised of micro spheres having a radius, the micro spheres being imbedded within a phonon conducting media;
a hot contact in thermal communication with the first phonon resonator; and
a cold contact in thermal communication with the first phonon resonator, the thickness of the first phonon resonator being at least two times larger than the radius of the micro spheres.

21. A phonon laser according to claim 20, wherein the micro spheres comprise either quartz or sapphire and the phonon conducting media comprises one or more of: plastic, high temperature epoxy, Kapton®, PVDF, a low melting point glass, or ceramics.

22. A phonon laser according to claim 20, further comprising:
a second phonon resonator being in thermal communication with the first phonon resonator; and
a metal cladding disposed between the first phonon resonator and the second phonon resonator.

23. A phonon laser according to claim 22, wherein the second phonon resonator includes the same phonon conducting media as the first phonon resonator.

24. A phonon laser according to claim 22, wherein the second resonator has a phonon attenuation coefficient between about 0.1 m$^{-1}$ to about $10^5$ m$^{-1}$.

25. A phonon laser according to claim 22, wherein the second resonator comprises a liquid in an envelope.

* * * * *